United States Patent [19]
Arnold et al.

[11] Patent Number: 6,167,449
[45] Date of Patent: Dec. 26, 2000

[54] SYSTEM AND METHOD FOR IDENTIFYING AND LOCATING SERVICES ON MULTIPLE HETEROGENEOUS NETWORKS USING A QUERY BY TYPE

[75] Inventors: Kevin M. Arnold; David M. Fisher, both of Los Gatos, Calif.

[73] Assignee: Apple Computer, Inc., Cupertino, Calif.

[21] Appl. No.: 08/974,008

[22] Filed: Nov. 19, 1997

[51] Int. Cl.[7] ............................. G06F 15/16; G06F 17/30
[52] U.S. Cl. ......................................... 709/227; 707/104
[58] Field of Search .................................. 709/227–228; 707/710, 104

[56] References Cited

U.S. PATENT DOCUMENTS

| | | | |
|---|---|---|---|
| 5,475,819 | 12/1995 | Miller et al. | 709/203 |
| 5,500,929 | 3/1996 | Dickinson | 345/356 |
| 5,566,278 | 10/1996 | Patel et al. | 395/114 |
| 5,596,723 | 1/1997 | Romohr | 709/222 |
| 5,675,787 | 10/1997 | Miller et al. | 707/104 |
| 5,678,004 | 10/1997 | Thaweethai | 713/201 |
| 5,689,700 | 11/1997 | Miller et al. | 707/10 |
| 5,692,180 | 11/1997 | Lee | 707/10 |
| 5,790,789 | 8/1998 | Suarez | 709/202 |
| 5,809,235 | 9/1998 | Sharma et al. | 709/230 |
| 5,822,521 | 10/1998 | Gartner et al. | 709/230 |
| 5,832,506 | 11/1998 | Kuzma | 707/200 |
| 5,915,096 | 1/1999 | Rosenzweig et al. | 709/227 |
| 5,920,868 | 7/1999 | Fowlow et al. | 707/103 |
| 6,016,499 | 1/2000 | Ferguson | 707/104 |
| 6,031,977 | 2/2000 | Pettus | 709/230 |

OTHER PUBLICATIONS

NetWare System Interface Technical Overview, Novell, Inc., Addison–Wesley Publishing, pp. 45–70, 253–262, 1990.

Meulemans, N., "A Yellow Pages Service Based on X.500," Computer Networks and ISDN Systems, vol. 28, No. 14, pp. 1939–1946, Nov. 1996.

Primary Examiner—Zarni Maung
Assistant Examiner—Andrew Caldwell
Attorney, Agent, or Firm—Blakely, Sokoloff, Taylor & Zafman

[57] ABSTRACT

A computer-implemented method and apparatus for identifying and locating computer network services. The invention gives an application the ability to search for network services in a manner independent of the network communication protocol used by the network. The invention can thus operate as a layer of abstraction between the Transport and Network Layers and the Application Layer of the Open Systems Interconnect (OSI) Reference Model of network architecture and suite of protocols. The invention gives the client application the ability to browse for network services based on the type of service (such as remote file access, mail, Web, domain name registration, etc.), rather than having to know the name or location of the service or the underlying network communication protocol used by the service. Some of the contemplated service name identification protocols used to find the requested types of services include Internet-related protocols such as Domain Name Service (DNS) and Lightweight Directory Access Protocol (LDAP), as well as Service Location Protocol (SLP), running on top of the Transport Control Protocol/Internet Protocol (TCP/IP).

36 Claims, 8 Drawing Sheets

SYSTEM AND METHOD FOR IDENTIFYING AND LOCATING SERVICES ON MULTIPLE HETEROGENEOUS NETWORKS USING A QUERY BY TYPE

BACKGROUND

This invention is generally related to client-server communication between computers over a network, and more particularly to identifying and locating services over a network.

The recent explosion in client-server communication has resulted in the availability of different types of services over computer networks such as the Internet. The computers on a network are typically configured with a client process ("client") that requests and obtains services from a server process ("server") that normally resides on a different computer on the network.

The network services ("services") that are typically available in most larger networks can be grouped into different types. One type of service is name identification, such as domain name registration and resolution used over the Internet. Domain name registration is used by providers of services, and, more generally, those wishing access to the Internet. The providers use the registration service to register themselves on the Internet by recording an alias and a corresponding unique network address in a service directory or database. Thereafter, the provider can be located by its alias using a domain name resolution service that accesses the service directory.

There are several software tools that help a user identify and locate the thousands of different services that may be available on a given network. For example, the popular "Web browsers", such as Netscape Navigator™ are commonly used to "surf" the Internet. Web browsers provide their user access to Internet services according to the Transport Control Protocol/Internet Protocol (TCP/IP) suite of network communication protocols ("network protocols").

If a user seeks a service and knows the alias of a service provider that offers a Web site for access to that service, then the Web browser can be used to look-up the network address of the server that provides the site by querying a domain name resolution service on the Internet. If the service provider had previously registered its name and network address, then the site's network or IP address is retrieved by the browser. The Web site services can then be accessed through the browser by issuing a properly configured request such as a Uniform Resource Locator (URL) that identifies the specific service protocol, the network address of the server, and any particular service options desired by the user such as the name of a file to be retrieved.

In the above scenario, the Web browser plays the role of an application program that must not only know the location (network address) of the provider of services, but also be fluent in TCP/IP which is the transport and network layer protocol suite used to communicate over the Internet. The problem is that the application cannot browse for network services, unless the exact location and network communication protocol used by a provider of the network service are known by the application.

Other software solutions exist that permit the browsing of network services, such as AppleTalk® Address Resolution Protocol (AARP) and Name Binding Protocol. These, however, are both specific to a network that is configured under AppleTalk®.

In other words, although the application need not know the exact location of a service provider, a search of network services is performed only on a particular network protocol or on a single local area network. This becomes a problem when an application seeks to browse for services in a network other than its own.

Therefore, it would be desirable to provide a standard method and apparatus that allows any application program to locate a service provider without having to know the exact location of the provider or the details of the network protocol used on the provider's network. In other words, it is desirable to allow an application program to browse for network services in a way that is independent of the network protocol used by the provider of network services.

SUMMARY

The invention is a computer-implemented method and apparatus for identifying and locating network services. In a particular embodiment, the invention features a computer system configured with a software interface between applications that need to locate services on a network and providers of identification services. In one embodiment, the software interface includes a Network Service Location manager program ("NSL manager") and its associated network access components that allow the applications to find services without having to specify the exact location of a provider and without being configured with the network protocol used by the provider of the services. The network access components in one embodiment are plug-ins to the NSL manager that are configured to access providers of identification services to search for a requested type of service using known service identification protocols that can be running over a variety of network protocols.

BRIEF DESCRIPTION OF THE DRAWINGS

These and other features as well as advantages of the different embodiments of the invention will be apparent by referring to the drawings, detailed description and claims below, where:

DETAILED DESCRIPTION

As summarized above and described in further detail below, the invention provides an interface for application programs to use when seeking to interact with or browse services provided on a network. The invention can be viewed as a level of abstraction to the Open Systems Interconnect (OSI) Reference Model between the Application Layer and the Network Layer, with which the application can browse for network services without being configured with the Network Layer protocols that are used to communicate with the provider of those services.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright© Apple Computer, Inc. 1997.

For purposes of explanation, specific embodiments are set forth below to provide a thorough understanding of the invention. However, as understood by one skilled in the art, from reading this disclosure, the invention may be practiced without such details. Furthermore, well-known elements, process steps, and the like, are not set forth in detail in order to avoid obscuring the invention.

Figure 1:
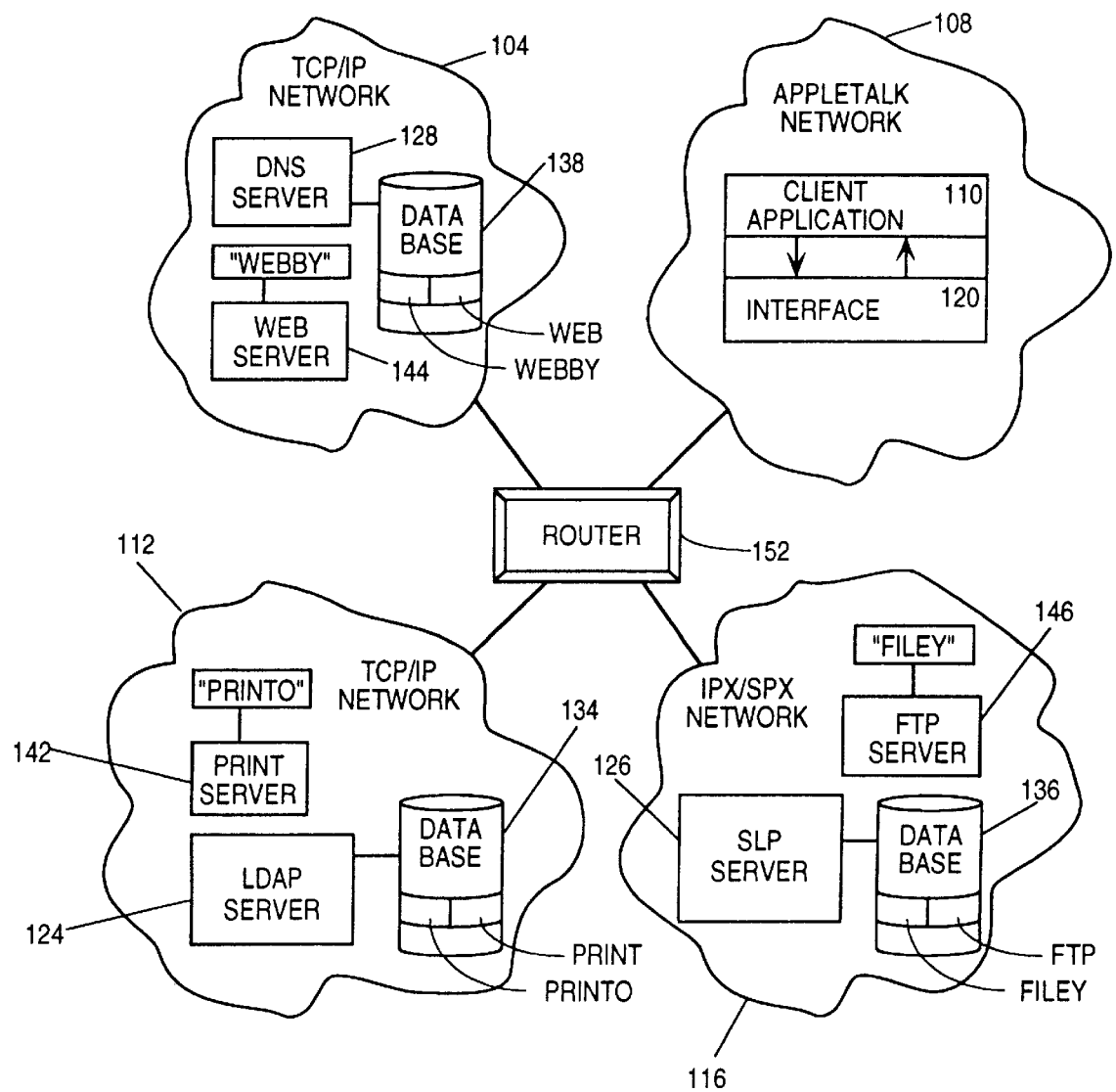
FIG. 1 is a logical block diagram of the software components in a client-server configuration for implementing a network service look-up procedure according to an embodiment of the invention.

FIG. 1 illustrates an overview of a client-server configuration used in a network service look-up procedure according to an embodiment of the invention. The Figure shows a number of networks that are configured with different Transport and Network Layer communication protocols ("network protocols") and coupled to each other using a router 152. The look-up procedure begins with a client application ("application") 110 in the AppleTalk network 108 sending a look-up request to an interface 120 for a particular type of service. The application 110 and interface 120 would normally be processes running on the same client computer or machine (not shown). The request can be accompanied by buffers which are used to hold the result data for the look-up request. The interface 120 is configured to access any number of service identification protocol (SIP) servers under predefined network protocols.

The interface 120 can be configured as a client to SIP servers based on several different combinations of SIPs running over different network protocols. For example, SIP server 124 can be a Lightweight Directory Access Protocol (LDAP) server running on TCP/IP, SIP server 126 can be a Service Location Protocol (SLP) server running on Internet Packet Exchange/Sequenced Packet Exchange (IPX/SPX), while SIP server 128 can be a Domain Name Service (DNS) server also running on TCP/IP. Thus, the different SIP servers can reside in different networks connected to each other using a router 152, as shown in FIG. 1, and communicate with interface 120 using their different identification and network protocols. Other network protocols that are contemplated include Microsoft's proprietary SMB.

The interface 120 receives a request for a type of service, and in response queries one or more of the SIP servers with which it is configured to communicate. In particular, the interface 120 looks up the type of service in each SIP server's database 134, 136, or 138 of registered services. Each database may have a table that lists registered service names, the network address of a server that provides the registered service, as well as the type of service provided. Examples of service types include: domain name registration and resolution; remote file access, (including services that implement, for example, the File Transfer Protocol (FTP) and AppleTalk Filing Protocol (AFP) (such as those provided by the FTP server "Filey" in FIG. 1) for sending and retrieving documents; mail services that provide receipt and forwarding of e-mail using such known protocols as Simple Mail Transfer Protocol (SMTP) and Post Office Protocol (POP); Web related services (such as those provided by the Web server 144 named "Webby" in FIG. 1) such as those accessed via the popular Web sites on the Internet, using such protocols as HyperText Transfer Protocol (HTTP) and Secure HTTP (S-HTTP); as well as printer services (such as those provided by the print server 142 named "Printo" in FIG. 1).

After collecting the entries in the SIP server database that have fields matching the requested service type, the interface 120 returns the result data (including perhaps the service name and/or the network address of a provider of the requested type of service) to the application 110 by placing the result data in the buffers previously received from the application 110.

The interface 120 thus allows any application 110 to browse for network services without being configured with the network protocol of a service provider. After the interface 120 has provided the application 110 with, for instance, a Uniform Resource Location (URL) of a provider of the requested type of service, the application can cause a more specialized application (such as a Web browser) to be launched which can then use the URL to easily access the provider's services.

Figure 5:
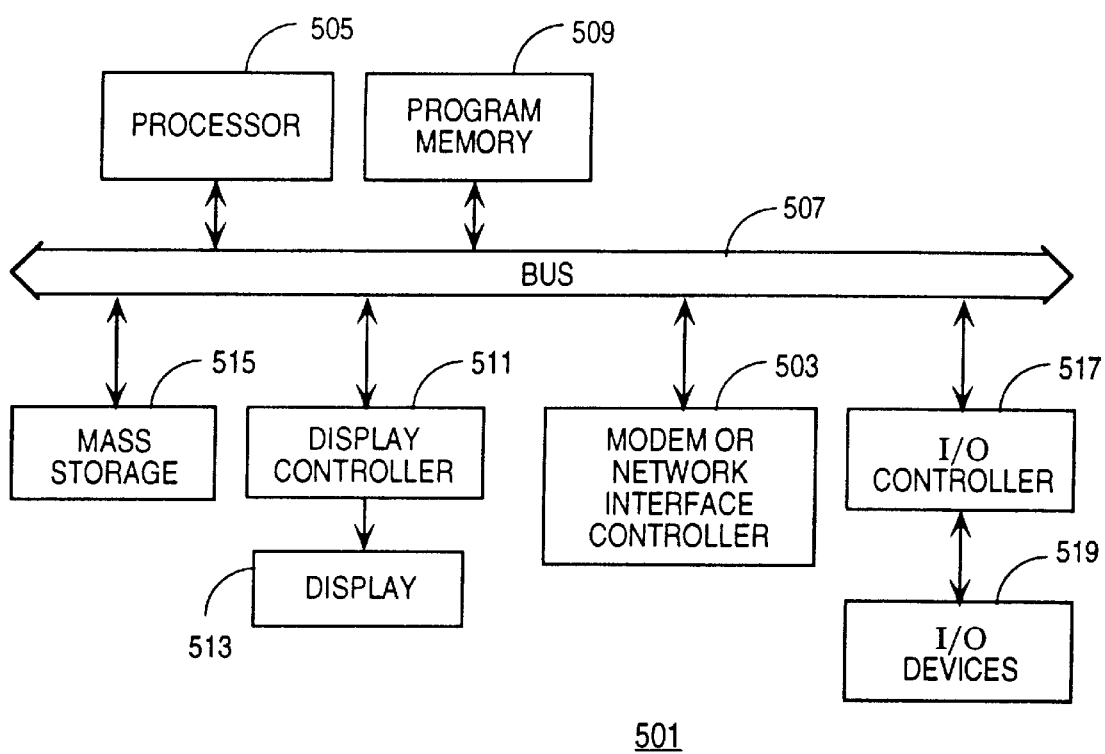
FIG. 5 shows an example of a computer system which may be used with an embodiment of the invention as a client or server machine.

The functions of the client and server processes (including client 110 and interface 120, and SIP servers of FIG. 1) may be implemented by programming a conventional computer system 501 such as the one illustrated in FIG. 5 having the typical hardware components of a processor 505, program memory 509, a network interface device such as a modem or a network interface controller 503, and a display device 513.

The various hardware components of the computer system 501 communicate with each other through a computer bus 507. The processor 505 can be any conventional microprocessor such as a Motorola Power PC microprocessor or an Intel Pentium® microprocessor. The program memory 509 contains the instructions that will be executed by the processor and will typically be composed of dynamic access random memory (DRAM) and may also include static RAM (SRAM). In contrast, the mass storage 515 is typically used as a non-volatile storage device that includes a conventional storage media such as rotating magnetic and/or optical disks. A display controller 511 will typically be used to provide high performance graphics functions in conjunction with display 513 which may be a CRT, or, if the computer system 501 is a portable laptop computer, a liquid crystal display or other suitable low power display device. The bus is also coupled to I/O devices 519 using an I/O controller 517, where the I/O devices may include a keyboard and pointing devices such as a mouse, additional mass storage devices such as disk drives, and printers.

It can be appreciated by one skilled in the art that the computer system 501 is merely an example of a wide range of possible computer systems which have different architectures that may be used to implement the software components and functionalities of the various embodiments of the invention. For instance, the computer system 501 made instead of being a desktop personal computer (PC), can be a network computer which may not necessarily include a mass storage device 515. The network computer will typically download the executable programs from a network connection into the program memory 509 for execution by the processor 505. The network connection can be made using a modem or network interface controller 503.

Examples of modems include analog modems, ISDN modems, and more recently, cable modems. Other network interface devices which may be used include a satellite transmission interface, e.g., "Direct PC" or other interface for generally coupling a computer system to a network of other computer systems.

The computer system 501 is also configured with any one of well-known operating systems and associated user interface and input/output (I/O) software, such as the Apple Macintosh® OS, UNIX, IBM® DOS and OS/2, and Microsoft Windows NT®.

Figure 2:
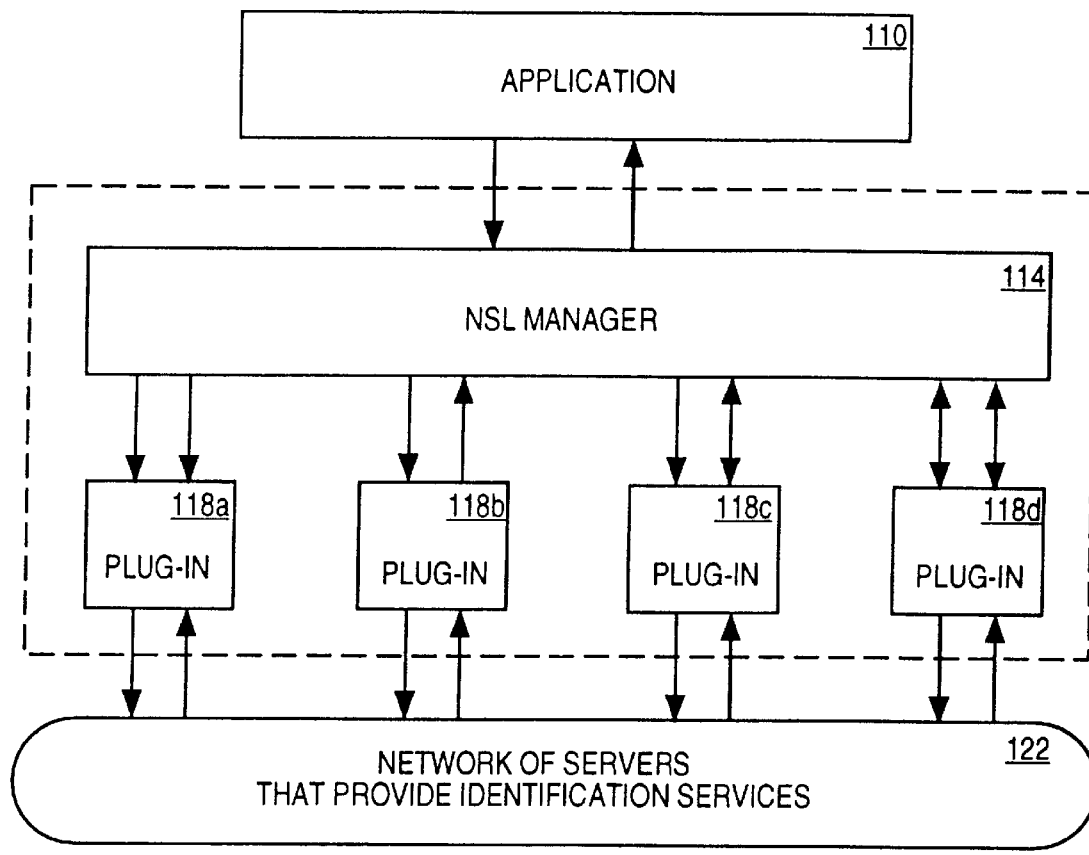
FIG. 2 illustrates software components for the network service look-up procedure according to another embodiment of the invention.

Turning now to another embodiment of the invention, FIG. 2 shows the interface 120 having a network service location manager program ("NSL manager") 114 and one or more network access software components such as plug-ins 118*a*, 118*b*, 118*c*, and 118*d*. The components or plug-ins may or may not be dynamically loaded into program memory, depending on the particular implementation. The look-up procedure using the embodiment of FIG. 2 begins with the application 110 sending a look-up request to the NSL manager 114 for a type of network service, such as any one of those introduced above. In a particular embodiment, the request is "sent" by the application 110 making a function call to an application programming interface (API) of the NSL manager 114. An exemplary API for interfacing the application 110 to the NSL manager is listed in Appendix A.

The NSL manager 114 after receiving the request forwards it to the 118*a*, 118*b*, 118*c*, and 118*d*. Each plug-in 118 interprets a particular service identification protocol (SIP) and network communication protocol used for communicating with the network of SIP servers 122. The plug-ins give the application the ability to browse a range of network services. For example, a separate plug-in can be configured to communicate under each SIP and network protocol introduced above, to search for a wide range of service types. The plug-ins 118 are normally specific to the operating system of the computer on which the network service look-up procedure is being implemented and a particular network communication protocol.

Each plug-in can register itself with the NSL manager 114 when the latter is launched in the client computer system, but the plug-in normally resides in program memory only when responding to an application's look-up request.

After receiving the forwarded request, the plug-in 118 looks for network services of the type specified in the look-up request by invoking the network communication protocol and the SIP with which it is configured. A provider of network services can then respond to queries from the plug-in, whereupon the plug-in then passes the results of such queries to the NSL manager 114. The NSL manager then in turn passes the results to the application 110. By providing a standard interface, that is independent of the location or network protocol used by a provider of the network services, embodiments of the invention permit easier integration of service browsing and search features into applications. For instance, a network service browsing tool can be configured to access the NSL manager's API without having to be configured with any service identification protocols or network protocols.

Figure 3:
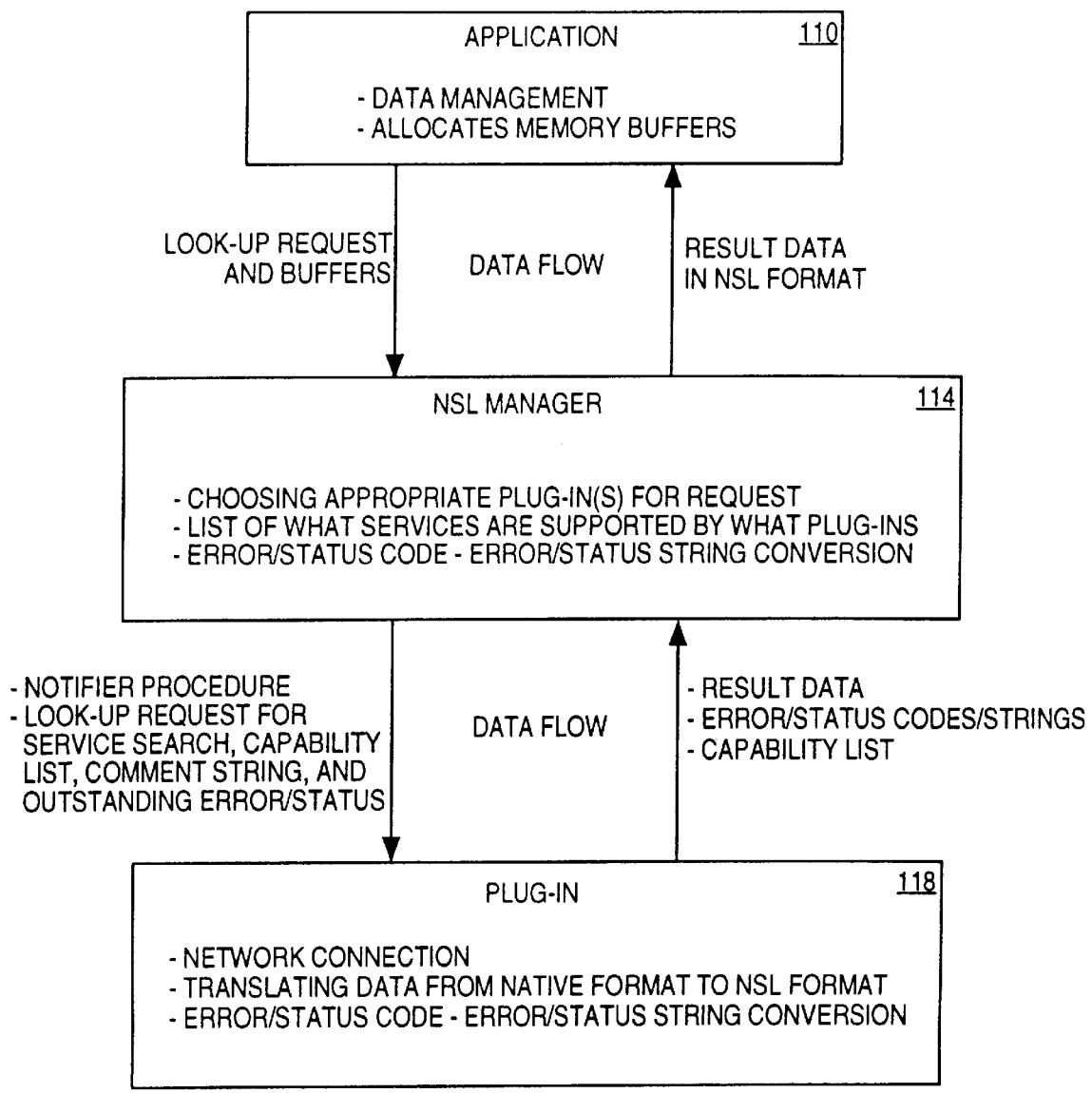
FIG. 3 is a more detailed logical block diagram of the software components and their basic functions used in network service look-up according to an embodiment of the invention.
Figure 7:
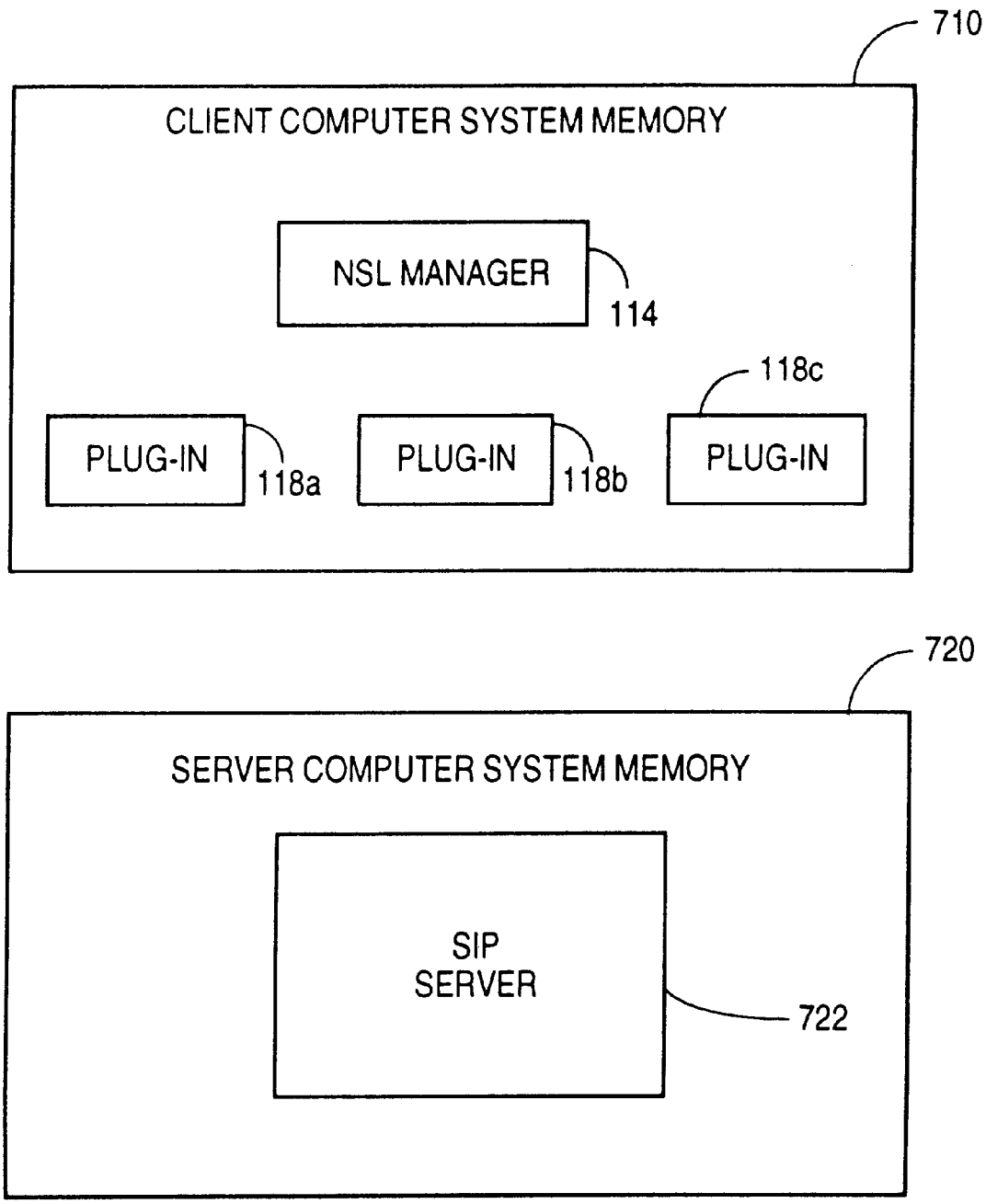
FIG. 7 illustrates an embodiment of the invention as computer system memory.
Figure 8:
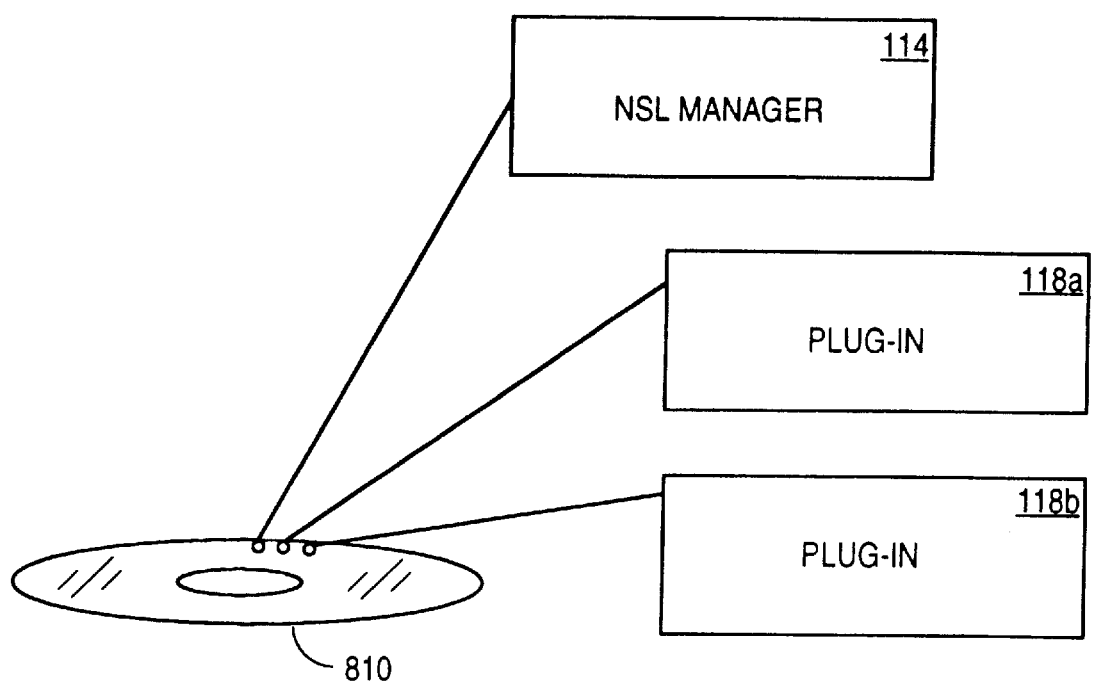
FIG. 8 shows an embodiment of the invention as a portable storage medium.

Turning now to FIG. 3, a more detailed view of the principal software architecture used in an embodiment of the invention is presented, showing data flow between and functionalities of the application, NSL manager, and plug-ins. The software can be stored in a wide range of computer-readable media as shown in FIGS. 7 and 8, including portable magnetic and/or optical disks 810 (e.g., CD ROM), devices such as semiconductor memory integrated circuits (e.g., program memory of the client computer system 710 and server computer system memory 720), and mass storage devices such as hard disks and tape storage (not shown). The computer system memory 710 normally includes the NSL manager and at least one plug-in. The client application 110 can optionally be loaded into the memory 710 as well. Similarly, on the server side, a server computer system memory 720 will include a SIP server process 722 that accesses a service directory or database (not shown).

FIG. 3 shows a summary of the data flow and functions performed by the different software components. The application 110 manages the data received as a result of a network service look-up request, and also allocates storage areas or memory buffers for receiving such data. The information passed to the NSL manager 114 by the application 110 includes the look-up request itself and one or more memory buffers (normally as pointers to memory) for holding the result data. The result data returned from the NSL manager 114 is normally in a format specified by the API of the NSL manager.

The NSL manager 114 can support multiple requests from multiple applications simultaneously, by assigning each received request a unique reference. The NSL manager 114 communicates with all plug-ins 118 that have registered with it and are otherwise available, and normally chooses the appropriate ones for handling a particular look-up request. Error and status codes are also provided by the NSL manager to the application 110 in the event of an error or change of status in each plug-in.

The information normally passed by the NSL manager to each selected plug-in 118 includes a notifier procedure, a memory buffer (obtained from the application), and of course the look-up request. The plug-in 118 receives the forwarded look-up request from the NSL manager 114 and in response searches for the type of service specified in the request by accessing a SIP server using the particular Network Layer protocols which it is configured to support. Examples of known Network Layer protocols include TCP/IP, AppleTalk®, and IPX/SPX. In addition to being configured to communicate according to a particular Network Layer protocol, a plug-in is also configured to search for network services using a particular SIP. Examples of industry standard SIPs that run on top of the Network Layer protocol and for which a plug-in can be configured are Domain Name Service (DNS), Lightweight Directory Access Protocol (LDAP) and more recently the Service Location Protocol (SLP) proposed by the Internet Engineering Task Force (IETF).

DNS is an industry standard for maintaining a database of mappings of domain names (service names or aliases) to IP addresses, used in the Internet. LDAP is an industry standard protocol for updating and searching service directories running over TCP/IP in large internets. In contrast, SLP is an example of a protocol that provides a dynamic configuration mechanism for applications in LANs and enterprise networks, without being a global resolution system for the entire Internet. The network service look-up procedure of the invention can thus be implemented on a wide range of networks and Network Layer protocols by properly configuring the plug-ins 118.

The plug-ins 118 are each configured to check the records of an SIP server's database for services of the type requested by the application 110. For example, the plug-in can issue a Zone Transfer request to a DNS server in order to access and parse the "well-known services" fields of all entries in the DNS records having the same domain name (or portion thereof). Although normally reserved and left unused by DNS, this text field can be used to enhance the service identification capabilities of DNS by being filled with data indicating the type of service (e.g., mail, Web, FTP, printer).

After parsing the service type fields and collecting matching entries, the plug-in 118 then forms a URL for each matching entry, and gives the URLs as result data to the NSL manager, or simply places them into the buffers received from the application 110.

As suggested with the DNS example above, the search for providers can be performed based on the domain name field of the entries in the SIP server database. The search may alternatively be performed by the plug-in on a network wide basis if desired by the user. But more likely, the search will be performed on a per domain basis so as to not generate a large amount of network traffic. In addition to domain-name based searching, the search of the SIP provider's records for service providers can also be performed based on geographical regions, similar to that used in the Name Binding Protocol (NBP), provided of course that the network protocols support such a classification scheme.

As another example of the service look-up procedure, the request may be for a remote file access (e.g., FTP), and can additionally include the type of network protocol used by a provider of the requested service, such as TCP/IP. The NSL manager then determines which plug-ins support TCP/IP, and then requests those plug-ins to perform a search for remote access file servers in the specified domain. In response, the selected plug-in will attempt to obtain the identity of as many remote file access servers as possible by checking, for instance, the records of an SLP directory agent. Result data (as URLs of matching service providers) is returned by the agent and placed in a predefined buffer that was received from the application 110. After being notified of the availability of the results by the NSL manager, the application can display the service names of such remote file access servers to the user via the display on the client computer system.

By placing itself squarely between the application 110 and the plug-in 118, the NSL manager 114 operates as a layer of abstraction in the OSI Reference Model between the Network Layer (interfaced by the plug-in 118) and the Application Layer (represented by application 110). This makes the API for the NSL manager a standard interface for applications to use when seeking to browse for network services, in a manner that is independent of the Network Layer protocols used by the various network services.

Other functions of a plug-in include translating the result data from a native format, or the format of the protocols used for communicating with the providers of the network services, to a format indicated by the NSL manager. Finally, the plug-in provides error and status code messages to the NSL manager as needed regarding the outcome of the search.

Figure 4:
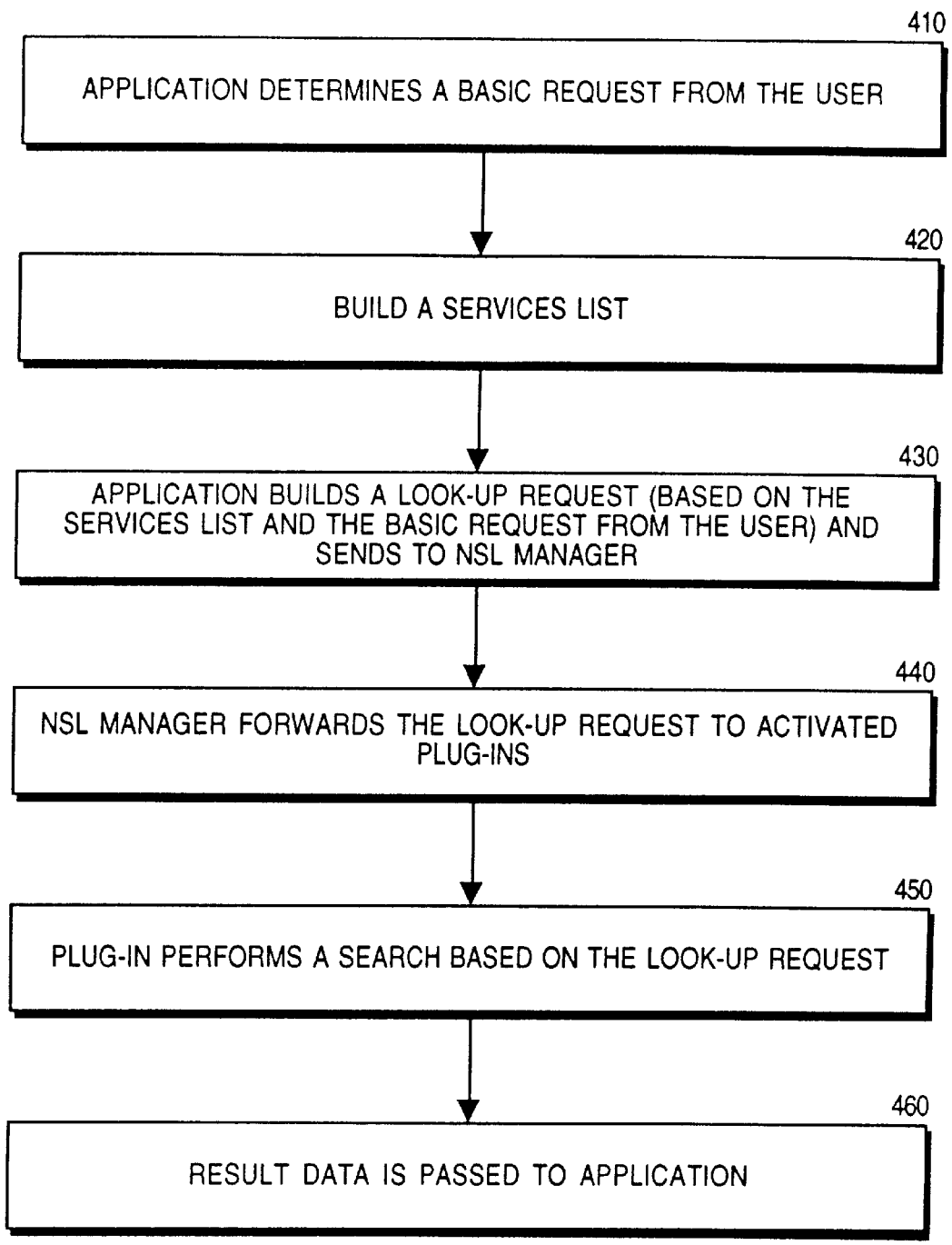
FIG. 4 is a flow chart of the steps performed between a client application the service manager program, and its associated plug-ins according to another embodiment of the invention.

FIG. 4 illustrates a still more detailed sequence of steps performed when the application 110 interacts with the NSL manager 114 according to another embodiment of the invention. The procedure begins by the application calling an API function to initialize the NSL manager. The NSL manager returns a client reference that the application can use to close the NSL manager when its look-up request has been satisfied. Operation then proceeds with step 410.

Figure 6:
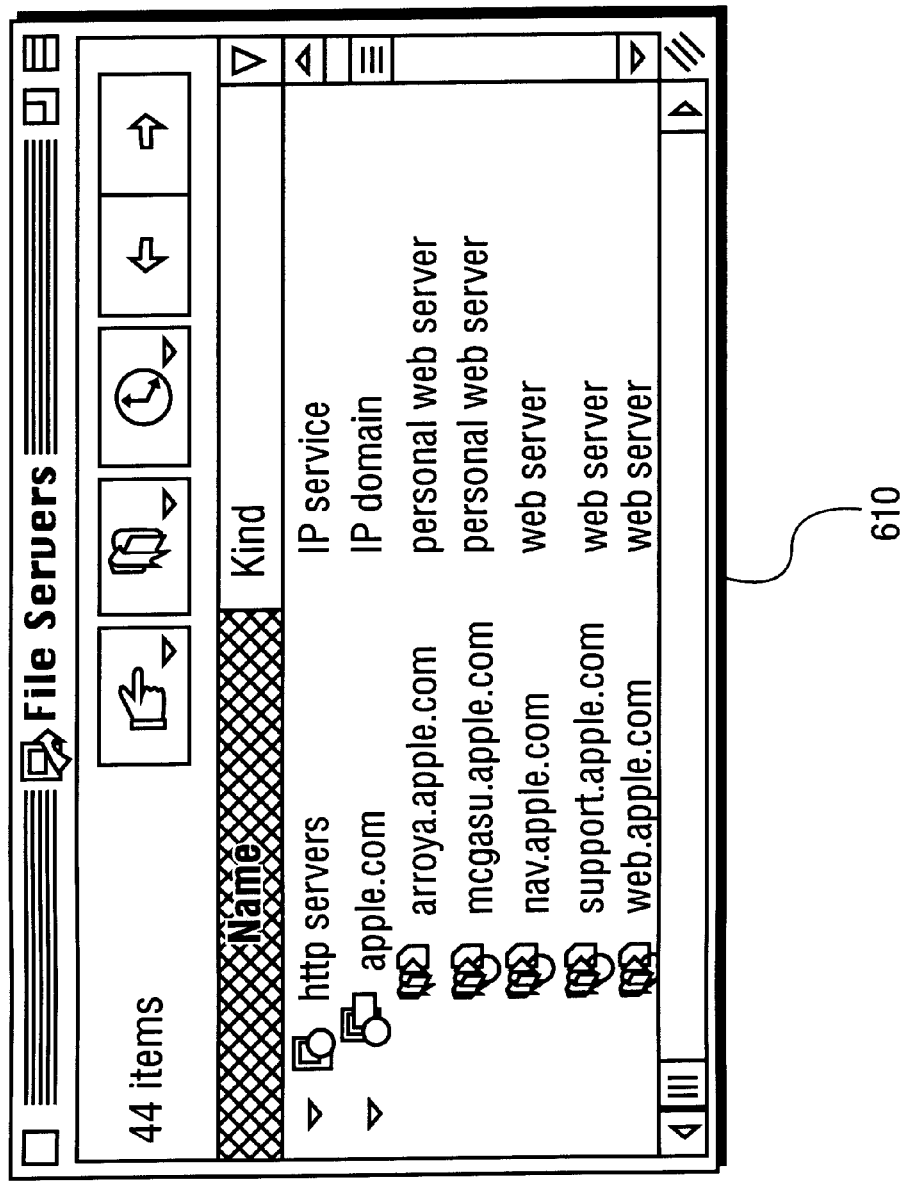
FIG. 6 is an example of a dialog box on a display device of a client computer system showing a hierarchy of services based on the type of service and the domain names of the servers.

In step 410, the application then determines a basic request from the user. For instance, the user can make a selection in the user interface of the computer system that defines a particular type of service. This may be "http servers" (IP Service) in the screen shot 610 of FIG. 6. The application then in step 420 asks the NSL manager for a list of services that can be accessed using the available plug-ins. The NSL manager in response queries the available plug-ins, and then passes the names of network protocols supported by the plug-ins as a services list to the application. The application may then display the list in a dialog box or other window, via a graphical user interface on a display unit of the computer system, as shown in the screen shot of FIG. 6. The services list may be a hierarchy of types of network services (based on the "kind of service") as shown in FIG. 6. Alternatively, the list can be a hierarchy of the geographic locations of providers of the type of service requested on the network to which the computer system is connected.

After building a services list, the application then in step 430 determines which items from the list are to be used for a look-up, and creates a look-up request for those selected items. The look-up request can be created based on, for example, a selection made by the user for Web servers located in a given IP domain which may be assigned to a particular organization (e.g., Apple Computer, Inc. or apple.com). The user then selects "apple.com", and a function call is then made to the NSL manager to start the look-up.

Operation then proceeds with steps 450 and 460 where the plug-in performs the search as described earlier and sends the result data to the NSL manager, which in turn forwards the data to the particular application. The result data is then displayed, as in FIG. 6, as a list of Web servers. The user can select a particular item in the list which, if the application is so configured, can cause a Web browser to launch and access the Web server in response to a URL from the application 110.

After the look-up request has been sent to the NSL manager, the application may wait for the NSL manager to return the results of the request. Alternatively, the application can turn to other tasks if the look-up request was also accompanied by a call back routine or a notifier routine that allows the NSL manager to asynchronously notify the application when a buffer is ready with result data, or when a buffer is full and more space is needed for additional data arriving from the plug-ins. If the application has requested a look-up from more than one plug-in, or more than one plug-in has responded, then the NSL manager can combine the results from the various plug-ins into a single response stream.

When the NSL manager indicates that there are no more results to return to the application, the application can make a function call to end or cancel the look-up request. Finally, if the application does not require additional look-ups at that time, then a function call to the NSL manager API can close the NSL manager.

To improve the performance of look-up requests, the application may be configured such that each look-up request is accompanied by a separate buffer for each plug-in that is known to be available. To obtain such an improvement, the application, prior to sending the look-up request, can ask the NSL manager to identify the number of plug-ins that are active in the computer system. By providing a separate buffer for each plug-in, the application eliminates the time required to set up additional buffers in the event more than one plug-in responds to the look-up request.

Another technique for improving performance is for the application to deactivate plug-ins that are inherently slower than other plug-ins. For instance, after the look-up request has been created, a determination is made as to which plug-ins are available on the particular computer, and to deactivate those plug-ins that the user does not want to participate in the look-up request. To accomplish these additional steps, the application, for instance, would make a function call to get a list of available plug-ins from the NSL manager, deactivate the unwanted plug-ins, add a buffer for each remaining activated plug-in, and then proceed with sending the look-up request to the NSL manager to start the look-up request using only the remaining active plug-ins.

The embodiments of the invention described above are, of course, subject to some variations in structure and implementation. For instance, the embodiments can be extended to support additional service identification protocols other than DNS, LDAP, and SLP simply by adding additional plug-ins that are configured to communicate under those additional protocols. Also, additional service types other than those disclosed can be defined and used which allow applications further flexibility in browsing for network services. Therefore, the scope of the invention should be determined not by the embodiments illustrated but by the appended claims and their legal equivalents.

What is claimed is:

1. A computer-implemented method comprising:

receiving a request from an application program for a type of network service;

selecting which of multiple heterogeneous networks will be accessed; and forwarding said request to at least one of a service manager's network access components configured to search for providers of said type of network service by querying the selected one of said multiple heterogeneous networks.

2. A method as in claim 1 further comprising:

querying at least one network for said type of network service wherein the records of a service directory on said network are searched; and receiving data related to said request from a provider of said service directory.

3. A method as in claim 2 further comprising:

identifying a storage area for receiving said data; and filling the storage area with said data.

4. A method as in claim 1 further comprising creating a list by the service manager of types of network services that may be accessed by the one or more network access components.

5. A method as in claim 4 wherein the list of types of network services comprises remote file access.

6. A method as in claim 1 further comprising:

sending a request to identify available network access components; and deactivating one or more of said available network access components responsive to a request by the application program to do so.

7. A method as in claim 1 wherein the request for a type of network service is a request to register services on a network.

8. A method as in claim 7 further comprising forwarding said request to at least one network access component configured to communicate with a provider of domain name registration services in accordance with Domain Name Service (DNS) running over TCP/IP.

9. A computer-readable medium having a plurality of instructions that cause a computer to perform the steps of:

receiving a request from an application program for a type of network service;

selecting which of multiple heterogeneous networks will be accessed; and forwarding said request to at least one of a service manager's network access components configured to search for providers of said type of network service by querying the selected one of said multiple heterogeneous networks.

10. A computer-readable medium as in claim 9 further comprising instructions that cause the network access component to perform the steps of:

querying at least one of said multiple heterogeneous networks for said type of network service wherein the records of a service directory on at least one of said multiple heterogeneous networks are searched; and receiving data related to said request from a provider of said type of network service.

11. A computer-readable medium as in claim 9 further comprising instructions that cause the step of:

determining types of network services that can be accessed by the network access components of said service manager in response to a request from an application program for a list of available network services.

12. A computer-readable medium as in claim 9 further comprising instructions that cause the steps of:

deactivating one or more of said network access components in response to receiving a second request from an application program to do so.

13. A computer-readable medium as in claim 9 further comprising instructions that cause the step of forwarding to further comprise:

forwarding a second request to register services on a network.

14. A computer-readable medium as in claim 13 further comprising instructions that cause the step of forwarding to further comprise:

forwarding said second request to at least one network access component configured to communicate with a provider of service name registration services.

15. A method of locating network services, comprising the steps of:

receiving a request for a type of service;

searching a plurality of reserved fields in DNS records for said type of service; and creating at least one identifier that identifies a provider of said type of service based on a DNS record having a reserved field that matches said type of service.

16. A method as in claim 15 wherein the step of receiving comprises receiving a request for printer services, and the step of creating comprises creating at least one identifier that identifies a network printer, the identifier including a data link layer address of the network printer.

17. A computer system comprising:

processor;

memory having instructions that when executed by the processor cause the computer system to perform the steps of:

receiving a request from an application program for a type of network service, selecting which of multiple heterogeneous networks will be accessed, and forwarding said request to a service manager including at least one network access component configured to query the selected one of said multiple heterogeneous networks for providers of said type of network service.

18. The system of claim 17 wherein the memory includes further instructions that when executed cause the system to perform the further steps of:

searching at least one network of said multiple heterogeneous networks responsive to a query by at least one network access component of said service manager for said type of network service wherein the records of a service directory on said network are searched; and receiving data related to said request from a provider of said type of network service.

19. The system of claim 18 wherein the memory includes further instructions that when executed cause the system to perform the further step of:

forwarding the data to the application.

20. The system of claim 18 wherein the memory includes further instructions that when executed cause the system to perform the further step of:

creating a list of types of network services that may be accessed by the network access components.

21. The system of claim 20 wherein the list further comprises remote file access.

22. The system of claim 17 wherein the memory includes further instructions that when executed cause the system to perform the further steps of:

receiving a request from the application to identify available network access components available within said service manager; and deactivating one or more of said available network access components.

23. The system of claim 17 wherein the request for a type of network service is a request to register services on a network.

24. The system of claim 23 wherein the memory includes further instructions that when executed cause the system to perform the further step of:

forwarding said request to at least one network access component configured to communicate with a provider of domain name registration services in accordance with Domain Name Service (DNS) running over TCP/IP.

25. The system of claim 17 further comprising a network interface device for connecting to the network in response to instructions sent by the processor.

26. The system of claim 17 wherein the application program resides in said memory.

27. The computer system of claim 17 wherein the service manager resides between the application and network layers of the Open Systems Interconnect (OSI) Reference Model of the International Standards Organization.

28. A computer system comprising:

means for receiving a request from an application program for a type of network service;

means for selecting which of multiple heterogeneous networks will be accessed;

means for issuing queries over the selected one of said multiple heterogeneous networks seeking providers of said type of network service;

means for receiving data from providers of said type of network service responsive to said queries; and means for responding to said request by communicating said data to said application program.

29. The computer system of claim 28 further comprising:

means for creating a list of networks that may be accessed by the application program responsive to a second request from the application program to do so, and means for communicating said list of networks to said application program.

30. The computer system of claim 28 further comprising:

means for deactivating access to at least one of said multiple heterogeneous networks responsive to a second request from the application program to do so.

31. The computer system of claim 28 further comprising:

means for creating a list of network services available on said multiple heterogeneous networks responsive to a request from the application program to do so, and means for communicating said list of network services to said application program.

32. The computer system of claim 28 further comprising:

means for searching the records of service directories in said multiple heterogeneous networks for providers of said network service.

33. The computer system of claim 28 further comprising:

means for processing said data.

34. The computer system of claim 33 wherein the means for processing said data further includes:

means for converting said data from a first format to a second format.

35. A computer-implemented method comprising:

receiving a request from an application program for a type of network service;

selecting which of multiple heterogeneous networks will be accessed;

forwarding said request to at least one of a service manager program's network access components;

querying the selected one of said multiple heterogeneous networks for said type of network service by causing the records of service directories on said selected one of said multiple heterogeneous networks to be searched;

receiving data related to said query from providers of said type of network service;

processing said data; and forwarding said data to said application program.

36. The computer-implemented method of claim 35 wherein processing includes:

converting said data from a first format to a second format; and wherein forwarding said data includes:

forwarding said data in said second format to said application program.

* * * * *